United States Patent Office 3,226,392
Patented Dec. 28, 1965

3,226,392
1-[N-ARYL-N-ACYLAMINOALKYL]-4-ARYL-1,2,3,6-
TETRAHYDROPYRIDINES, THE CORRESPOND-
ING PIPERIDINES AND THEIR SALTS
Philip M. Carabateas, East Greenbush, N.Y., assignor to
Sterling Drug Inc., New York, N.Y., a corporation of
Delaware
No Drawing. Filed Mar. 7, 1960, Ser. No. 12,910
17 Claims. (Cl. 260—293.4)

This invention relates to compositions of matter of the class of partially-hydrogenated pyridines, to processes for making such compositions, to intermediates for use in such processes, to the hydrogenation of said partially-hydrogenated pyridines, and of the resulting corresponding piperidines.

1,2,3,6-tetrahydropyridines and piperidines having a 4-(lower-aryl) substituent and a lower-alkyl or lower-aralkyl radical attached to the nitrogen atom of the partially-hydrogenated pyridine or piperidine ring are known in the art.

The present invention, in its composition aspect, is described as residing in the concept of a composition having a molecular structure in which an N-(lower-aromatic) - N - (lower-carboxylic-acylamino)-(polycarbon-lower-alkyl) substituent is attached to the nitrogen atom (or 1-position) of 4-(lower-aryl)-1,2,3,6-tetrahydropyridines and 4-(lower-aryl)piperidines.

The physical embodiments of my invention have been tested by standard pharmacological evaluation procedures in cats and found to possess antitussive activity, and in rats and found to possess analgesic activity.

The term "lower-carboxylic-acyl," as used herein, means carboxylic acyl radicals having from two to seven carbon atoms, inclusive, and is illustrated by ethanoyl (acetyl), propanoyl (propionyl) n-butanoyl (butyryl), 2-methylpropanoyl, n-pentanoyl, n-hexanoyl, n-heptanoyl, 2-propenoyl (acrylyl), 2-methylpropenoyl, 2-butenoyl, methoxyacetyl, ethoxyacetyl, n - propoxyacetyl, 3 - methoxypropanoyl, 3 - carboxypropanoyl, 4-carboxybutanoyl, and the like.

The term "lower-aryl," as used herein, means aryl radicals of the benzene or naphthalene series, as defined and illustrated herein below as part of the term "lower-aromatic."

The term "lower-aromatic," as used herein, means radicals having one or two aromatic rings which can be benzenoid or five- or six-membered heteroaromatic, as illustrated by phenyl, naphthyl, biphenylyl, pyridyl, pyrimidyl, furyl, thiazolyl, oxazolyl, triazinyl, thienyl, and the like. Preferred embodiments have as "lower-aromatic" monocarbocyclic-aryl radicals having six ring carbon atoms, that is, aryl radicals of the benzene series. These embodiments, which are preferred primarily because of their commercial practicability due to availability of intermediates, include compounds where "lower-aromatic" is the unsubstituted phenyl radical and phenyl radicals substituted by low-molecular weight substituents such as lower-alkyl, lower-alkoxy, lower-alkylmercapto, lower - alkylsulfonyl, halo, lower - alkylamino, di-(lower-alkyl)amino, nitro, amino, lower-carboxylic-acylamino, trifluoromethyl, phenoxy, benzyloxy, hydroxy, phenylmercapto, benzyl, 4-methoxyphenyl, and the like. The substituted phenyl radicals have preferably from one to three substituents which can be in any of the available positions of the phenyl nucleus, and where more than one substituent is present, they can be the same or different and they can be in any of the various position combinations relative to each other. The lower-alkyl, lower - alkoxy, lower - alkylmercapto, lower-alkylsulfinyl, lower-alkylsulfonyl, lower-alkylamino, lower-carboxylic-acylamino, and the like substituents have preferably from one to six carbon atoms which can be arranged as straight or branched chains, and are illustrated by methyl, ethyl, n-hexyl, methoxy, isobutoxy, ethylmercapto, n-amylmercapto, methylsulfinyl, n-propylsulfinyl, isopropylsulfonyl, n-butylsulfonyl, ethylamino, n-butylamino, acetylamino, propionylamino, and the like.

The term "polycarbon-lower-alkylene" or "substituted-polycarbon-lower-alkyl," as used herein, means alkylene radicals having from two to six carbon atoms, inclusive, and is illustrated by —CH$_2$CH$_2$—, —CH(CH$_3$)CH$_2$—, —CH$_2$CH$_2$CH$_2$CH$_2$—, —CH$_2$CH$_2$CH$_2$CH$_2$CH$_2$—, $$-\mathrm{CH_2\overset{|}{C}HCH_3}$$

—CH$_2$CH$_2$CH$_2$—, —C(CH$_3$)$_2$CH$_2$—, $$-\mathrm{CH_2\overset{|}{C}HCH_2CH_3}$$

—CH(CH$_3$)CH$_2$CH$_2$—, —CH$_2$CH$_2$CH$_2$CH$_2$CH$_2$CH$_2$—, and the like.

Embodiments of my invention in its composition-aspect that are preferred because of their commercial practicability due to availability of intermediates are the 1-[(N-aryl-N - acylamino)alkyl] - 4 - phenyl-1,2,3,6-tetrahydropyridines having in free base form the structural Formula I

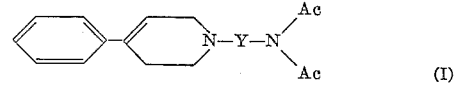

where Y represents polycarbon-lower-alkylene, Ac represents lower-alkanoyl and Ar represents monocarbocyclic-aryl having six ring-carbon atoms.

The invention, in its process aspect, is described as residing in the concept of reacting a 1-[(lower-aromatic-amino) - (polycarbon - lower - alkyl)]-4-(lower-aryl)-1,2,3,6-tetrahydropyridine with a lower-carboxylic-acylating agent to prepare a 1-[N-(lower-aromatic)-N-(lower-carboxylic - acylamino) - (polycarbon - lower-alkyl)]-4-(lower - aryl) - 1,2,3,6-tetrahydropyridine. A lower-carboxylic acid anhydride or halide is used as the lower-carboxylic-acylating agent, preferably the anhydride. The reaction is carried out using the acylating agent and 4-aryl-1,2,3,6-tetrahydropyridine, preferably with, but optionally without, an inert solvent such as chloroform, benzene, toluene, ethyl acetate, and the like. The acylation is best accomplished by warming the 4-aryl-1,2,3,6-tetrahydropyridine with the acyl anhydride in the presence or absence of an inert solvent; or alternatively it can be carried out at room temperature or at higher temperatures up to about 150° C.

Another aspect of my invention resides in the catalytic hydrogenation of said 1 - [N - (lower-aromatic)-N-(lower - carboxylic - acylamino) - (polycarbon - lower-alkyl)] - 4 - (lower - aryl)-1,2,3,6-tetrahydropyridines and in the resulting corresponding 1 - [N - (lower - aromatic) - N - (lower - carboxylic-acylamino)-(polycarbon-lower-alkyl)]-4-(lower-aryl)-piperidines produced thereby. The hydrogenation is carried out in the presence of a hydrogenation catalyst effective to catalyze carbon-to-carbon double bonds, e.g., platinum, palladium, etc., catalysts, and is preferably carried out in the presence of a suitable solvent, e.g., a lower-alkanol (methanol, ethanol). Alternatively, these piperidines can be prepared by first catalytically hydrogenating the appropriate 4 - (lower-aryl)-1,2,3,6-tetrahydropyridine, reacting the resulting 4-(lower-aryl)-piperidine with a (lower-aromatic-amino)-(polycarbon-lower-alkyl) ester, e.g., bromide, and reacting the resulting 1 - [(lower - aromatic-amino)-(polycarbon - lower - alkyl)]-4-(lower-aryl)piperidine with an acyl anhydride or halide to form the 1-[N-(lower-aromatic) - N - (lower - carboxylic-acylamino)-(polycarbon-lower - alkyl)] - 4-(lower-aryl)piperidine. Preferred embodiments of the resulting piperidines are the 1-[(N-aryl-N - acylamino)alkyl] - 4-phenylpiperidines having in free base form the structural Formula II

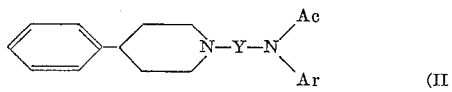

where Y represents polycarbon-lower-alkylene, Ac represents lower-alkanoyl and Ar represents monocarbocyclic-aryl having six ring-carbon atoms.

My 1 - [N - (lower - aromatic)-N-(lower-carboxylic-acylamino) - (polycarbon - lower - alkyl)] - 4 - (lower-aryl) - 1,2,3,6 - tetrahydropyridines and 1-[N-(lower-aromatic) - N - (lower-carboxylic-acylamino)-(polycarbon - lower - alkyl)]-4-(lower-aryl)piperidines are useful in the free base form or in the form of acid-addition salts; and both forms are within the purview of the invention, and, in fact, are considered to be one and the same invention. The acid-addition salts are simply a more convenient form for use; and, in practice, use of the salt form inherently amounts to use of the base form. The acids which can be used to prepare the acid-addition salts are preferably those which produce, when combined with the free base, pharmacologically acceptable salts, that is, salts whose anions are relatively innocuous to the animal organism in pharmacological doses of the salts, so that the beneficial physiological properties inherent in the free base are not vitiated by side effects ascribable to the anions; in other words, the latter do not substantially affect the pharmacological properties inherent in the cations. In practicing my invention, I found it convenient to form the hydrochloride salts. However, other appropriate pharmacologically acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, benzenesulfonic acid, p-toluenesulfonic acid, quinic acid, and the like, giving the hydrobromide, hydriodide, nitrate, phosphate, sulfamate, acetate, citrate, tartrate, lactate, methanesulfonate, ethanesulfonate, benzenesulfonate, p-toluenesulfonate and quinate, respectively.

The acid-addition salts are prepared either by dissolving the free base in aqueous solution containing the appropriate acid and isolating the salt by evaporating the solution, or by reacting the free base and acid in an organic solvent, in which case the salt separates directly or can be obtained by concentration of the solution.

Although pharmacologically acceptable salts are preferred, all acid-addition salts are within the scope of my invention. All acid-addition salts are useful as sources of the free base form even if the particular salt per se is not desired as the final product as, for example, when the salt is formed only for purposes of purification or identification, or when it is used as an intermediate in preparing a pharmacologically acceptable salt by ion exchange procedures.

Also encompassed by my invention are quaternary-ammonium salts of the aforesaid 1-[N-(lower-aromatic)-N - (lower - carboxylic - acylamino)-(polycarbon-lower-alkyl)] - 4 - (lower - aryl) - 1,2,3,6-tetrahydropyridines and 1 - [N - (lower-aromatic)-N-(lower-carboxylic-acyl-amino) - (polycarbon - lower - alkyl)]-4-(lower-aryl)-piperidines. These salts are useful for further identification of the aforesaid basic tetrahydropyridines and piperidines. The quaternary ammonium salts are obtained by the addition of esters having a molecular weight less than about 200 to the free base form of the compounds. A preferred class of esters comprises alkyl, alkenyl or aralkyl esters of inorganic acids or organic sulfonic acids, and include such compounds as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides such as p-chlorobenzyl chloride, p-nitrobenzyl chloride, o-chlorobenzyl chloride, p-methoxybenzyl chloride, and the like. The quaternary ammonium salts are prepared by mixing the free base and the alkyl, alkenyl or aralkyl esters in an organic solvent inert under the conditions of reaction, for example, ethanol, methanol, ether, acetonitrile and the like. Heating can be used to facilitate the reaction, although salt formation usually takes place readily at room temperature. The quaternary ammonium salt separates directly or can be obtained by concentration of the solution.

Another aspect of my invention resides in my intermediates in the form of their free bases and their acid-addition salts, and, also, in their preparation. The invention, in its intermediate composition aspect, is described as residing in the concept of a composition having a molecular structure in which a (lower-aromatic-amino)-(polycarbon-lower-alkyl) substituent is attached to the 1-position of 4 - (lower-aryl)-1,2,3,6-tetrahydropyridines. These intermediate embodiments are prepared by reacting a 4 - (lower-aryl)-1,2,3,6-tetrahydropyridine with a (lower-aromatic-amino)-(polycarbon-lower-alkyl) ester of a strong inorganic acid or an organic sulfonic acid, said ester preferably being a halide, e.g., bromide, chloride, iodide. The reaction is preferably carried out by heating the reactants, preferably with, and optionally without, an appropriate solvent inert under the reaction conditions, e.g., chloroform, n-butanol, at a temperature between about 50° C. and 150° C. Also within the purview of the intermediate composition aspects of the invention are acid-addition salts of the above-said 1-[(lower - aromatic - amino) - (polycarbon-lower-alkyl)]-4-(lower-aryl)-1,2,3,6-tetrahydropyridines, said salts being like those defined and illustrated above for the corresponding final products.

The molecular structures of the final products and intermediates of my invention are established by their mode of synthesis and corroborated by the correspondence of calculated and found values for the elementary analyses for representative examples.

The following examples will further illustrate the invention without, however, limiting it thereto.

*Example 1.—4-phenyl-1-[2-(N-phenyl-N-propionylamino)-ethyl]-1,2,3,6-tetrahydropyridine hydrochloride*

A mixture containing 5 g. of 4-phenyl-1-(2-phenyl-aminoethyl)-1,2,3,6-tetrahydropyridine and 50 cc. of propionic anhydride was heated on a steam bath for about three hours. The excess propionic anhydride was removed by distilling in vacuo. The residue was dissolved in isopropyl alcohol, the solution acidified with concentrated hydrochloric acid, and the resulting mixture concentrated in vacuo to dryness. The remaining material was dissolved in about 25 cc. of warm isopropyl alcohol, the solution diluted with an equal volume of ether, and the resulting mixture cooled in an ice bath. The white crystalline precipitate was collected, recrystallized twice from ethanol-ether and dried at 60° C. for four hours to yield the product, 4-phenyl-1-[2-(N-phenyl-N-propionyl-amino)ethyl] - 1,2,3,6-tetrahydropyridine hydrochloride, M.P. 170–172° C.

*Analysis.*—Calcd. for $C_{22}H_{26}N_2O \cdot HCl$: N, 7.56; O, 4.31. Found: N, 7.36; O, 4.36.

Pharmacological evaluation of 4-phenyl-1-[2-(N-phenyl-N-propionlylamino)ethyl]-1,2,3,6 - tetrahydropyridine hydrochloride in aqueous solution administered intraperitoneally to anesthetized cats subject to mechanical stimulation according to known procedures to induce coughing has shown that this compound is approximately as effective an antitussive agent as codeine.

4 - phenyl-1-[2-(N-phenyl-N-propionlylamino)ethyl]-1,2,3,6-tetrahydropyridine is obtained in its free base form by dissolving the hydrochloride salt in water, treating the solution with aqueous sodium hydroxide solution, extracting the liberated basic product with benzene, drying the benzene extract over anhydrous sodium sulfate and removing the benzene by distilling in vacuo. The free base can then be reacted with various acids, e.g., hydrobromic acid, hydriodic acid, hydrofluoric acid, sulfuric acid, sulfamic acid, citric acid, methanesulfonic acid, ethanesulfonic acid, benzenesulfonic acid or quinic acid to give, respectively, the hydrobromide, hydriodide, hydrofluoride, sulfate, sulfamate, citrate, methanesulfonate, ethanesulfonate, benzenesulfonate or quinate salts of 4 - phenyl-1-[2-(N-phenyl-N-propionylamino)-ethyl]-1,2,3,6-tetrahydropyridine. Any other acid-addition salt can be prepared similarly using the desired acid.

The hydrofluoride salt of 4-phenyl-1-[2-(N-phenyl-N-propionylamino)ethyl]-1,2,3,6-tetrahydropyridine can be converted to the hydrochloride salt by passing it through an ion exchange resin saturated with chloride ion.

Additional 4 - phenyl-1-[2-(N-phenyl-N-alkanoylamino)ethyl]-1,2,3,6-tetrahydropyridines are obtained following the above procedure but using other alkanoic anhydrides in place of propionic anhydride. For example using 2-methylpropanoic anhydride, n-pentanoic anhydride or n-hexanoic anhydride, there are obtained 4 - phenyl - 1 - [2-(N-phenyl-N-[2-methylpropanoyl]-amino)-ethyl]-1,2,3,6-tetrahydropyridine, 4 - phenyl-1-[2-(N-phenyl-N-[n - pentanoyl]amino)ethyl] - 1,2,3,6-tetrahydropyridine or 4 - phenyl-1-[2-(N-phenyl-N-[n-hexanoyl]amino)ethyl]-1,2,3,6 - tetrahydropyridine, respectively. These products can be isolated in their free base form or in the form of their acid-addition salts, preferably the hydrochlorides.

The intermediate 4 - phenyl-1-(2-phenylaminoethyl)-1,2,3,6-tetrahydropyridine was prepared as follows: A mixture containing 14.05 g. of 2-phenylaminoethyl bromide hydrobromide, 7.95 g. of 4-phenyl-1,2,3,6-tetrahydropyridine, 15 g. of sodium carbonate and 75 cc. of n-butanol was refluxed with stirring for twenty-four hours. The reaction mixture was cooled, filtered and the filtrate concentrated in vacuo to remove the butanol. The remaining oil was taken up in ether; the mixture was filtered; and a solution of hydrogen chloride in ether was added to the filtrate. The resulting solid, after an unsuccessful attempt to recrystallize it from ethyl acetate-methanol, was made basic with 35% aqueous sodium hydroxide solution and the mixture was extracted with benzene. The benzene extract was washed with water, dried over anhydrous sodium sulfate and concentrated in vacuo to remove the benzene. The remaining oil was concentrated in vacuo and the fraction boiling at 160–175° C. at 0.05 mm. was collected. This fraction, 4-phenyl-1-(2-phenylaminoethyl)-1,2,3,6 - tetrahydropyridine, was dissolved in ether and the resulting solution was treated with etheral hydrogen chloride to yield a white precipitate. The precipitate was recrystallized several times from ethanol to yield 3.3 g. of 4-phenyl-1-(2-phenylaminoethyl)-1,2,3,6 - tetrahydropyridine dihydrochloride, M.P. 209.2–219.0° C. (corr.) with decomposition.

*Analysis.*—Calcd. for $C_{19}H_{22}N_2 \cdot 2HCl$: C, 64.96; H, 6.88; Cl, 20.18. Found: C, 65.05; H, 6.90; Cl, 19.99.

Additional intermediate 1-[(lower-aromatic-amino)-(polycarbon-lower-alkyl)-4-(lower-aryl) - 1,2,3,6-tetrahydropyridines that are obtained following the above procedure for the preparation of 4-phenyl-1-(2-phenylaminoethyl)-1,2,3,6-tetrahydropyridine using the appropriate 4-(lower-aryl) - 1,2,3,6 - tetrahydropyridine and (lower-aromatic-amino)-(polycarbon-lower-alkyl) ester, preferably bromide, are the following:

1-[2-(2-methoxyphenylamino)ethyl]-4-phenyl-1,2,3,6-tetrahydropyridine,
1-[2-(3-ethoxyphenylamino)ethyl]-4-phenyl-1,2,3,6-tetrahydropyridine,
4-phenyl-1-[2-(3,4,5-trimethoxyphenylamino)ethyl]-1,2,3,6-tetrahydropyridine,
1-[2-(2,4-dimethylphenylamino)ethyl]-4-phenyl-1,2,3,6-tetrahydropyridine,
1-[3-(2-chloro-4-ethoxyphenylamino)propyl]-4-phenyl-1,2,3,6-tetrahydropyridine,
1-[2-(4-chlorophenylamino)ethyl]-4-phenyl-1,2,3,6-tetrahydropyridine,
1-[2-(4-n-butylaminophenylamino)ethyl]-4-phenyl-1,2,3,6-tetrahydropyridine,
1-[2-(4-methylmercaptophenylamino)ethyl]-4-phenyl-1,2,3,6-tetrahydropyridine,
4-phenyl-1-[3-(4-n-propylsulfinylphenylamino)propyl]-1,2,3,6-tetrahydropyridine,
1-[2-(4-n-butylsulfonylphenylamino)ethyl]-4-phenyl-1,2,3,6-tetrahydropyridine,
1-[2-(4-acetylaminophenylamino)ethyl]-4-phenyl-1,2,3,6-tetrahydropyridine,
1-[2-(2-naphthylamino)ethyl]-4-phenyl-1,2,3,6-tetrahydropyridine,
1-[2-(1-biphenylylamino)-ethyl]-4-phenyl-1,2,3,6-tetrahydropyridine,
1-[3-(2-furylamino)-propyl]-4-phenyl-1,2,3,6-tetrahydropyridine,
4-phenyl-1-[2-(4-pyridylamino)ethyl]-1,2,3,6-tetrahydropyridine,
4-phenyl-1-[2-(3-pyridylamino)ethyl]-1,2,3,6-tetrahydropyridine,
4-phenyl-1-[3-(2-thienylamino)propyl]-1,2,3,6-tetrahydropyridine,
4-phenyl-1-[2-(2-pyrimidylamino)ethyl]-1,2,3,6-tetrahydropyridine,
4-phenyl-1-[2-(2-thiazolylamino)ethyl]-1,2,3,6-tetrahydropyridine,
4-phenyl-1-(4-phenylaminobutyl)-1,2,3,6-tetrahydropyridine,
4-phenyl-1-(5-phenylaminopentyl)-1,2,3,6-tetrahydropyridine,
4-phenyl-1-(6-phenylaminohexyl)-1,2,3,6-tetrahydropyridine,
4-phenyl-1-(2-phenylaminopropyl)-1,2,3,6-tetrahydropyridine,
4-phenyl-1-(3-phenylamino-2-propyl)1,2,3,6-tetrahydropyridine,
1-[2-(4-nitrophenylamino)ethyl]-4-phenyl-1,2,3,6-tetrahydropyridine,
1-[2-(4-aminophenylamino)ethyl]-4-phenyl-1,2,3,6-tetrahydropyridine,
1-[2-(2-oxazolylamino)ethyl]-4-phenyl-1,2,3,6-tetrahydropyridine,
4-phenyl-1-[3-(2-triazinylamino)propyl]1,2,3,6-tetrahydropyridine,
4-phenyl-1-[2-(2-pyridylamino)ethyl]-1,2,3,6-tetrahydropyridine,
4-phenyl-1-[2-(3-trifluoromethylphenylamino)ethyl]-1,2,3,6-tetrahydropyridine,
4-phenyl-1-[2-(4-phenoxyphenylamino)ethyl]-1,2,3,6-tetrahydropyridine,
1-[2-(3-benzyloxyphenylamino)ethyl]-4-phenyl-1,2,3,6-tetrahydropyridine,
1-[2-(3-hydroxyphenylamino)ethyl]-4-phenyl-1,2,3,6-tetrahydropyridine,
4-phenyl-1-[3-(4-phenylmercaptophenylamino)propyl]-1,2,3,6-tetrahydropyridine,
1-[2-(4-benzylphenylamino)ethyl]-4-phenyl-1,2,3,6-tetrahydropyridine,
4-(2-naphthyl)-1-(2-phenylaminoethyl)-1,2,3,6-tetrahydropyridine,
4-(3-methoxyphenyl)-1-(3-phenylaminopropyl)1,2,3,6-tetrahydropyridine,
1-(3-phenylaminopropyl)-4-p-tolyl-1,2,3,6-tetrahydropyridine,
1-[2-(4-dimethylaminophenylamino)ethyl]-4-phenyl-1,2,3,6-tetrahydropyridine, and the like. These intermediates can be isolated in their free base form, as illustrated above, or in the form of their acid-addition salts, preferably their hydrochlorides.

*Example 2.—4-phenyl-1-[3-(N - phenyl - N - propionylamino)propyl]-1,2,3,6 - tetrahydropyridine hydrochloride*

A mixture containing 30.0 g. of 4-phenyl-1,2,3,6-tetrahydropyridine, 59 g. of 3-phenylaminopropyl bromide hydrobromide, 150 cc. of chloroform and 50 cc. of triethylamine was refluxed for twenty-four hours. The reaction mixture was cooled and made basic with 35% aqueous sodium hydroxide solution. The chloroform layer was separated, washed with water, dried over anhydrous calcium sulfate and concentrated in vacuo to yield an oil. The oil was treated with ether, the mixture filtered and the filtrate concentrated in vacuo to remove the ether, thereby yielding the intermediate, 4-phenyl-1-(3-phenylaminopropyl)-1,2,3,6-tetrahydropyridine. To this intermediate was added 30 cc. of propionic anhydride and the resulting mixture was allowed to stand overnight. To the reaction mixture was added 100 cc. of methanol; the resulting mixture was concentrated in vacuo; and the resulting oil was poured into water. The aqueous mixture was made basic with 35% aqueous sodium hydroxide solution and the alkaline mixture was extracted with ether. The ether extract was dried over anhydrous sodium sulfate and the ether removed by distilling in vacuo. The remaining oil was dried further by adding benzene and removing the benzene by distillation. The oil was then dissolved in ether and to the resulting solution was added a solution of hydrogen chloride in ether. The gummy precipitate was separated and boiled several times with ethyl acetate. There was thus obtained a white solid which was recrystallized from propionitrile to yield 10.1 g. of 4-phenyl-1-[3-(N-phenyl-N-propionylamino)propyl]-1,2,3,6-tetrahydropyridine hydrochloride, M.P. 188.5–193.0° C. (corr.).

*Analysis.*—Calcd. for $C_{23}H_{28}N_2O \cdot HCl$: C, 71.78; H, 7.60; Cl, 9.21. Found: C, 72.09; H, 7.52; Cl, 9.25.

The same product is obtained following the above procedure using a molar equivalent quantity of propionyl chloride in place of propionic anhydride.

Pharmacological evaluation of 4-phenyl - 1 - [3 - (N-phenyl-N-propionylamino)propyl] - 1,2,3,6 - tetrahydropyridine hydrochloride in aqueous solution administered to rats subcutaneously using the D'Amour-Smith method has shown that this compound is about seven tenths as potent an analgesic as meperidine hydrochloride on a molar basis in terms of bases.

*Example 3.—4-phenyl-1-[2-(N-phenyl - N - acetylamino) ethyl]-1,2,3,6-tetrahydropyridine hydrochloride*

This compound was prepared following the procedure described in Example 2 first using 30.0 g. of 4-phenyl-1,2,3,6-tetrahydropyridine, 56 g. of 2-phenylaminoethyl bromide hydrobromide, 150 cc. of chloroform and 50 cc. of triethylamine to yield the intermediate 4-phenyl-1-(2-phenylaminoethyl)-1,2,3,6 - tetrahydropyridine and then treating this with 25 cc. of acetic anhydride as in Example 2 in place of propionic anhydride. There was thus obtained 3.6 g. of 4-phenyl-1-[2-(N-phenyl - N - acetylamino)ethyl]-1,2,3,6 - tetrahydropyridine hydrochloride, M.P. 188.4–189.6° C. (corr.) when recrystallized twice from propionitrile.

*Analysis.*—Calcd. for $C_{21}H_{24}N_2O \cdot HCl$: C, 70.69; H, 7.06; Cl, 9.94. Found: C, 70.76; H, 7.01; Cl, 10.12.

*Example 4.—4-phenyl-1-[2-(N-phenyl-N - [n - butaneyl] amino)ethyl]-1,2,3,6-tetrahydropyridine hydrochloride*

A mixture containing 19.5 g. of 4-phenyl-1-(2-phenylaminoethyl)-1,2,3,6-tetrahydropyridine and 25 cc. of n-butanoic anhydride was heated until the tetrahydropyridine dissolved; and the resulting solution was then allowed to stand overnight. To the reaction mixture was added 25 cc. of methanol and the resulting mixture was concentrated in vacuo. The remaining oil was stirred with 10% aqueous sodium hydroxide solution and extracted with benzene. The benzene extract was distilled in vacuo to remove the benzene and the remaining oil was distilled to yield 4-phenyl-1-[2-(N-phenyl-N-[n-butanoyl]amino)ethyl] - 1, 2,3,6-tetrahydropyridine, B.P. 175–183° C. at 0.1 mm. The oily product was dissolved in ether; ethereal hydrogen chloride was added to yield a gummy precipitate; and the precipitate was recrystallized once from propionitrile-ether and once from propionitrile to yield 3.0 g. of 4-phenyl-1-[2-(N-phenyl-N-[n-butanoyl]amino)ethyl - 1,2, 3,6-tetrahydropyridine hydrochloride, M.P. 182.4–183.6° C. (corr.).

*Analysis.*—Calcd. for $C_{23}H_{28}N_2O \cdot HCl$: C, 71.78; H, 7.60; Cl, 9.21. Found: C, 71.77; H, 7.79; Cl, 8.96.

Other representative 1-[N-(lower-aromatic)-N-(lower-carboxylic-acylamino)-(polycarbon - lower - alkyl)] - 4-(lower-aryl)-1,2,3,6-tetrahydropyridines that can be prepared according to the foregoing procedures using the corresponding 4-(lower-aryl)-1-[(lower - aromatic - amino)-(polycarbon-lower-alkyl)]-1,2,3,6-tetrahydropyridine and appropriate lower-carboxylic-acylating agent are the following compounds of Examples 5–29, 31–36 and 38–43. These compounds can be isolated in their free base form or in the form of their acid-addition salts, preferably their hydrochloride, as illustrated.

*Example 5*

1 - [2 - (N - [2-methyloxyphenyl]-N-propionylamino) ethyl]-4-phenyl-1,2,3,6-tetrahydropyridine hydrochloride is obtained following the procedure described in Example 2 using molar equivalent quantities of 1-[2-(2-methoxyphenylamino)ethyl] - 4 - phenyl - 1,2,3,6 - tetrahydropyridine and propionic anhydride.

*Example 6*

1 - [2 - (N-[3-ethoxyphenyl]-propionylamino)ethyl]-4-phenyl-1,2,3,6-tetrahydropyridine hydrochloride is obtained following the procedure described in Example 2 using molar equivalent quantities of 1-[2-(3-ethoxyphenylamino)ethyl] - 4 - phenyl-1,2,3,6-tetrahydropyridine and propionic anhydride.

*Example 7*

4 - phenyl - 1 - [2-(N-[3,4,5-trimethoxyphenyl]-N-propionylamino)ethyl]-1,2,3,6-tetrahydropyridine hydrochloride is obtained following the procedure described in Example 2 using molar equivalent quantities of 4-phenyl-1-[2-(3,4,5-trimethoxyphenylamino)ethyl] - 1,2,3,6 - tetrahydropyridine and propionic anhydride.

*Example 8*

1 - [2 - (N - [2,4-dimethylphenyl]-N-propionylamino) ethyl]-4-phenyl-1,2,3,6-tetrahydropyridine hydrochloride is obtained following the procedure described in Example 2 using molar equivalent quantities of 1-[2-(2,4-dimethylphenylamino)ethyl] - 4 - phenyl - 1,2,3,6 - tetrahydropyridine and propionic anhydride.

*Example 9*

1 - [3 - (N - [2 - chloro-4-ethoxyphenyl]-N-propionylamino)propyl]-4-phenyl-1,2,3,6-tetrahydropyridine hydrochloride is obtained following the procedure described in Example 2 using molar equivalent quantities of 1-[3-(2-chloro - 4 - ethoxyphenylamino)propyl]-4-phenyl-1,2,3,6-tetrahydropyridine and propionic anhydride.

*Example 10*

1 - [2 - (N-[4-chlorophenyl]-N-propionylamino)ethyl]-4-phenyl-1,2,3,6-tetrahydropyridine hydrochloride is obtained following the procedure described in Example 2 using molar equivalent quantities of 1-[2-(4-chlorophenylamino)ethyl] - 4 - phenyl-1,2,3,6-tetrahydropyridine and propionic anhydride.

Example 11

1 - [2 - (N-[4-n-butylaminophenyl]-N-propionylamino)ethyl]-4-phenyl-1,2,3,6-tetrahydropyridine hydrochloride is obtained by reacting 1-[2-(N-4-aminophenylpropionamido)ethyl]-4-phenyl-1,2,3,6-tetrahydropyridine hydrochloride with n-butyraldehyde and a reducing agent effective in reductive alkylations using aliphatic aldehydes, e.g., iron and acetic acid or hydrogen and Raney nickel.

Example 12

1 - [2 - (N - [4 - methylmercaptophenyl]-N-propionylamino)ethyl]-4-phenyl-1,2,3,6-tetrahydropyridine hydrochloride is obtained following the procedure described in Example 2 using molar equivalent quantities of 1-[2-(4 - methylmercaptophenylamino)ethyl]-4-phenyl-1,2,3,6-tetrahydropyridine and propionic anhydride.

Example 13

4-phenyl - 1 - [3-(N-[4-n-propylsulfinylphenyl]-N-propionylamino)propyl] - 1,2,3,6 - tetrahydropyridine hydrochloride is obtained following the procedure described in Example 2 using molar equivalent quantities of 4-phenyl - 1 - [3-(4-n-propylsulfinylphenylamino)propyl]-1,2,3,6-tetrahydropyridine and propionic anhydride.

Example 14

1 - [2-(N-[4-n-butylsulfonylphenyl] - N - acetylamino)ethyl]-4-phenyl-1,2,3,6-tetrahydropyridine hydrochloride is obtained following the procedure described in Example 2 using molar equivalent quantities of 1-[2-(4-n-butylsulfonylphenylamino)ethyl] - 4 - phenyl - 1,2,3,6 - tetrahydropyridine and acetic anhydride.

Example 15

1-[2-(N-[4-acetylaminophenyl] - N - propionylamino)ethyl]-4-phenyl-1,2,3,6-tetrahydropyridine hydrochloride is obtained following the procedure described in Example 2 using molar equivalent quantities of 1-[2-(4-acetylaminophenylamino)ethyl]-4-phenyl - 1,2,3,6 - tetrahydropyridine and propionic anhydride.

Example 16

1 - [2-(N-[2-naphthyl] - N - propionylamino)ethyl]-4-phenyl-1,2,3,6-tetrahydropyridine hydrochloride is obtained following the procedure described in Example 2 using molar equivalent quantities of 1-[2-(2-naphthylamino)ethyl]-4-phenyl - 1,2,3,6 - tetrahydropyridine and propionic anhydride.

Example 17

1-[2-(N-[1-biphenylyl] - N - propionylamino)ethyl]-4-phenyl-1,2,3,6-tetrahydropyridine hydrochloride is obtained following the procedure described in Example 2 using molar equivalent quantities of 1-[2-(1-biphenylylamino)ethyl]-4-phenyl - 1,2,3,6 - tetrahydropyridine and propionic anhydride.

Example 18

1-[3-(N-[2-furyl] - N - acetylamino)propyl]-4-phenyl-1,2,3,6-tetrahydropyridine hydrochloride is obtained following the procedure described in Example 2 using molar equivalent quantities of 1-[3-(2-furylamino)propyl]-4-phenyl-1,2,3,6-tetrahydropyridine and acetic anhydride.

Example 19

4-phenyl-1-[2-(N - [4 - pyridyl] - N - propionylamino)ethyl]-1,2,3,6-tetrahydropyridine dihydrochloride is obtained following the procedure described in Example 2 using molar equivalent quantities of 4-phenyl-1-[2-(4-pyridylamino)ethyl]-1,2,3,6-tetrahydropyridine and propionic anhydride.

Example 20

4-phenyl-1-[2-(N - [3 - pyridyl] - N - propionylamino)ethyl]-1,2,3,6-tetrahydropyridine dihydrochloride is obtained following the procedure described in Example 2 using molar equivalent quantities of 4-phenyl-1-[2-(3-pyridylamino)ethyl]-1,2,3,6-tetrahydropyridine and propionic anhydride.

Example 21

4-phenyl-1-[3-(N - [2 - thienyl] - N - propionylamino)propyl]-1,2,3,6-tetrahydropyridine hydrochloride is obtained following the procedure described in Example 2 using molar equivalent quantities of 4-phenyl-1-[3-(2-thienylamino)propyl]-1,2,3,6-tetrahydropyridine and propionic anhydride.

Example 22

4-phenyl-1-[2 - (N - [2 - pyrimidyl] - N - acetylamino)ethyl]-1,2,3,6-tetrahydropyridine hydrochloride is obtained following the procedure described in Example 2 using molar equivalent quantities of 4-phenyl-1-[2-(2-pyrimidylamino)ethyl] - 1,2,3,6 - tetrahydropyridine and acetic anhydride.

Example 23

4-phenyl-1-[2-(N-[2 - thiazolyl] - N - propionylamino)ethyl]-1,2,3,6-tetrahydropyridine hydrochloride is obtained following the procedure described in Example 2 using molar equivalent quantities of 4-phenyl-1-[2-(2-thiazoylamino)ethyl]-1,2,3,6-tetrahydropyridine and propionic anhydride.

Example 24

4-phenyl-1-[4-(N-phenyl - N - propionylamino)butyl]-1,2,3,6-tetrahydropyridine hydrochloride is obtained following the procedure described in Example 2 using molar equivalent quantities of 4-phenyl-1-(4-phenylaminobutyl)-1,2,3,6-tetrahydropyridine and propionic anhydride.

Example 25

4 - phenyl-1-[5-(N-phenyl-N-propionylamino)pentyl]-1,2,3,6-tetrahydropyridine hydrochloride is obtained following the procedure described in Example 2 using molar equivalent quantities of 4-phenyl-1-(5-phenylaminopentyl)-1,2,3,6-tetrahydropyridine and propionic anhydride.

Example 26

4-phenyl-1-[6-N-phenyl - N - acetylamino)hexyl]-1,2,3,6-tetrahydropyridine hydrochloride is obtained following the procedure described in Example 2 using molar equivalent quantities of 4-phenyl-1-(6-phenylaminohexyl)-1,2,3,6-tetrahydropyridine and acetic anhydride.

Example 27

4 - phenyl-1-[2-(N-phenyl-N-propionylamino)propyl]-1,2,3,6-tetrahydropyridine hydrochloride is obtained following the procedure described in Example 2 using molar equivalent quantities of 4-phenyl-1-(2-phenylaminopropyl)-1,2,3,6-tetrahydropyridine and propionic anhydride.

Example 28

4-phenyl-1-[3-(N-phenyl - N - propionylamino)-2-propyl]-1,2,3,6-tetrahydropyridine hydrochloride is obtained following the procedure described in Example 2 using molar equivalent quantities of 4-phenyl-1-(3-phenylamino-2-propyl)-1,2,3,6-tetrahydropyridine and propionic anhydride.

Example 29

1-[-2-(N-[4-nitrophenyl]-N-propionylamino)ethyl] - 4-phenyl-1,2,3,6-tetrahydropyridine hydrochloride is obtained following the procedure described in Example 2 using molar equivalent quantities of 1-[2-(4-nitrophenylamino)ethyl] - 4 - phenyl-1,2,3,6-tetrahydropyridine and propionic anhydride.

Example 30

1-[2-(N-[4-aminophenyl] - N - propionylamino)ethyl]-4-phenyl-1,2,3,6-tetrahydropyridine hydrochloride is obtained by reacting the corresponding 4-nitrophenyl compound of Example 29 with a reducing agent effective to reduce nitro groups to amino groups, e.g., iron and hydrochloric acid.

Example 31

1-[2-(N-[2-oxazolyl] - N - propionylamino)ethyl]-4-phenyl-1,2,3,6-tetrahydropyridine hydrochloride is obtained following the procedure described in Example 2 using molar equivalent quantities of 1-[2-(2-oxazolylamino)ethyl]-4-phenyl - 1,2,3,6 - tetrahydropyridine and propionic anhydride.

Example 32

4-phenyl-1-[3-(N-[2-triazinyl] - N - acetylamino)propyl]-1,2,3,6-tetrahydropyridine hydrochloride is obtained following the procedure described in Example 2 using molar equivalent quantities of 4-phenyl-1-[3-(2-triazinylamino)propyl]-1,2,3,6-tetrahydropyridine and propionic anhydride.

Example 33

4-phenyl-1-[2-(N-[2-pyridyl] - N - propionylamino)ethyl]-1,2,3,6-tetrahydropyridine dihydrochloride is obtained following the procedure described in Example 2 using molar equivalent quantities of 4-phenyl-1-[2-(2-pyridylamino)ethyl]-1,2,3,6-tetrahydropyridine and propionic anhydride.

Example 34

4-phenyl-1-[2-(N-[3-trifluoromethylphenyl] - N - propionylamino)-ethyl] - 1,2,3,6 - tetrahydropyridine hydrochloride is obtained following the procedure described in Example 2 using molar equivalent quantities of 4-phenyl-1-[2 - (3-trifluoromethylphenylamino)ethyl]-1,2,3,6-tetrahydropyridine and propionic anhydride.

Example 35

4 - phenyl-1-[2-(N-[4-phenoxyphenyl] - N - methoxyacetylamino)-ethyl] - 1,2,3,6 - tetrahydropyridine hydrochloride is obtained following the procedure described in Example 2 using molar equivalent quantities of 4-phenyl-1-[2-(4-phenoxyphenylamino)ethyl] - 1,2,3,6 - tetrahydropyridine and methoxyacetic anhydride.

Example 36

1-[2-(N-[3-benzyloxyphenyl] - N - propionylamino)ethyl]-4-phenyl-1,2,3,6-tetrahydropyridine hydrochloride is obtained following the procedure described in Example 2 using molar equivalent quantities of 1-[2-(3-benzyloxyphenylamino)ethyl]-4-phenyl - 1,2,3,6 - tetrahydropyridine and propionic anhydride.

Example 37

1 - [2 - (N - [3 - hydroxyphenyl]-N-propionylamino)ethyl]-4-phenyl-1,2,3,6-tetrahydropyridine hydrochloride is obtained by reacting the correspoinding 3-benzyloxyphenyl compound with Example 36 with hydrogen under pressure in the presence of a catalyst, e.g., platinum oxide, i.e., under catalytic hydrogenation conditions effective to debenzylate the benzyloxy group.

Example 38

4-phenyl-1-[3 - (N - [4 - phenylmercaptophenyl]-N-acetylamino)propyl] - 1,2,3,6-tetrahydropyridine hydrochloride is obtained following the procedure described in Example 2 using molar equivalent quantities of 4-phenyl-1 - [3 - (4 - phenylmercaptophenylamino)propyl]-1,2,3,6-tetrahydropyridine and acetic anhydride.

Example 39

1-[2-(N-[4-benzylphenyl] - N - propionylamino)ethyl]-4-phenyl-1,2,3,6-tetrahydropyridine hydrochloride is obtained following the procedure described in Example 2 using molar equivalent quantities of 1-[2-(4-benzylphenylamino)ethyl] - 4 - phenyl - 1,2,3,6-tetrahydropyridine and propionic anhydride.

Example 40

4-(2-naphthyl) - 1 - [2-(N-phenyl-N-propionylamino)ethyl]-1,2,3,6-tetrahydropyridine hydrochloride is obtained following the procedure described in Example 2 using molar equivalent quantities of 4-(2-naphthyl)-1-(2-phenylaminoethyl) - 1,2,3,6 - tetrahydropyridine and propionic anhydride.

Example 41

4 - (3 - methoxyphenyl)-1-[3-(N-phenyl-N-propionylamino)propyl]-1,2,3,6-tetrahydropyridine hydrochloride is obtained following the procedure described in Example 2 using molar equivalent quantities of 4-(3-methoxyphenyl) - 1 - ( 2 - phenylaminoethyl)-1,2,3,6-tetrahydropyridine and propionic anhydride.

Example 42

1-[3-(N-phenyl-N-acetylamino)propyl] - 4 - (p-tolyl)-1,2,3,6-tetrahydropyridine hydrochloride is obtained following the procedure described in Example 2 using molar equivalent quantities of 1-(2-phenylaminoethyl)-4-(p-tolyl)-1,2,3,6-tetrahydropyridine and acetic anhydride.

Example 43

1 - [2 - (N - [4 - dimethylaminophenyl]-N-propionylamino phenyl - 1,2,3,6 - tetrahydropyridine hydrochloride is obtained following the procedure described in Example 2 using molar equivalent quantities of 1-[2-(4-dimethylaminophenylamino)ethyl]-4-phenyl - 1,2,3,6-tetrahydropyridine and propionic anhydride.

Example 44.—4-phenyl-1-[2-(N-phenyl-N-propionylamino)ethyl]-1,2,3,6-tetrahydropyridine methochloride To 6.1 g. of 4-phenyl-1-[2-(N-phenyl-N-propionylamino)ethyl] - 1,2,3,6-tetrahydropyridine hydrochloride suspended in water was added an exces of 35% aqueous sodium hydroxide solution and the mixture was extracted with ether. The extract was concentrated in vacuo to remove the ether and the remaining oil was dissolved in 75 cc. of acetone. To the acetone solution was added 2.42 g. of methyl iodide whereupon an exothermic reaction ensued. The solution was allowed to stand for one hour and then concentrated in vacuo to yield an oil containing 4 - phenyl - 1 - [2-(N-phenyl-N-propionylamino)ethyl]-1,2,3,6-tetrahydropyridine methiodide. The oil was dissolved in 250 cc. of ethanol and the ethanol solution was passed through a column of an ion exchange resin saturated with chloride ions (Amberlite® IRA-400). The solution was then concentrated in vacuo and the resulting oil was dissolved in 20 cc. of acetonitirile. To this solution was added ether and the resulting white precipitate was collected. There was thus obtained 4.8 g. of the product, 4 - phenyl-1-[2-(N-phenyl-N-propionylamino)-ethyl] - 1,2,3,6 - tetrahydropyridine methochloride, M.P. 198.0–199.2° C. (corr.).

*Analysis.*—Calcd. for $C_{23}H_{29}ClN_2O$: Cl, 9.21; N, 7.28. Found: Cl, 9.36; N, 7.42.

Using allyl chloride or benzyl bromide as the quaternizing agent in place of methyl iodide and using the same 1,2,3,6-tetrahydropyridine as above, there is obtained 4-phenyl - 1 - [2-(N-phenyl-N-propionylamino)ethyl]-1,2,3,6-tetrahydropyridine allochloride or 4-phenyl-1-[2-(N-phenyl - N - propionylamino)ethyl] - 1,2,3,6-tetrahydropyridine benzobromide, respectively.

Example 45.—4-phenyl-1-[2-(N-phenyl-N-propionylamino)ethyl]piperidine hydrochloride 4-phenyl - 1 - [2-(N-phenyl-N-propionylamino)ethyl]-1,2,3,6-tetrahydropyridine hydrochloride (4.7 g.) in 100 cc. of ethanol in presence of 150 mg. of platinum oxide was catalytically hydrogenated (13.9 lbs. per sq. in. of hydrogen) in a Paar apparatus. The theoretical quantity of hydrogen was taken up in about fifteen minutes. The reaction mixture was filtered to remove the catalyst and the filtrate was concentrated to a volume of about 25 cc.

The crystalline product that separated was collected and recrystallized from ethanol-ether to yield 2.9 g. of the product, 4-phenyl - 1 - [2-(N-phenyl-N-propionylamino)-ethyl]piperidine hydrochloride, M.P. 220.0–221.2° C. (corr.).

*Analysis.*—Calcd. for $C_{22}H_{28}N_2O \cdot HCl$: Cl, 9.51; N, 7.52. Found: Cl, 9.62; N, 7.67.

Pharmacological evaluation of 4-phenyl-1-[2-(N-phenyl-N-propionylamino)ethyl]piperidine hydrochloride in aqueous solution administered to rats subcutaneously using the D'Amour-Smith method has shown that this compound is about eleven times as potent an analgesic as meperidine hydrochloride on a molar basis in terms of the bases.

4-phenyl - 1 - [2-(N-phenyl-N-propionylamino)ethyl]-piperidine is obtained in its free base form by dissolving the hydrochloride salt in water, treating the solution with aqueous sodium hydroxide solution, extracting the liberated basic product with benzene, drying the benzene extract over anhydrous sodium sulfate and removing the benzene by distilling in vacuo. The free base can then be reacted with various acids, e.g., hydrobromic acid, hydriodic acid, hydrofluoric acid, sulfuric acid, sulfamic acid, citric acid, methanesulfonic acid, ethanesulfonic acid, benzenesulfonic acid or quinic acid to give, respectively, the hydrobromide, hydriodide, hydrofluoride, sulfate, sulfamate, citrate, methanesulfonate, ethanesulfonate, benzenesulfonate or quinate salts of 4-phenyl-1-[2-(N-phenyl - N - propionylamino)ethyl]piperidine. Any other acid-addition salt can be prepared similarly using the desired acid.

Additional 4-phenyl - 1 - [2-(N-phenyl-N-alkanoylamino)ethyl]piperidines are obtained following the above procedure but using other alkanoic anhydrides in place of propionic anhydride. For example, using 2-methyl-propanoic anhydride, n-pentanoic anhydride or n-hexanoic anhydride, there are obtained 4-phenyl-1-[2-(N-phenyl-N-[2-methylpropanoyl]amino)ethyl]piperidine, 4-phenyl-1-[2 - (N-phenyl-N-[n-pentanoyl]amino)ethyl]piperidine or 4-phenyl - 1-[2-(N-phenyl-N-[n-hexanoyl]amino)ethyl]piperidine, respectively. These products can be isolated in their free base form or in the form of their acid-addition salts, preferably the hydrochlorides.

Following the above procedure for the preparation of 4 - phenyl-1 - [2-(N-phenyl-N-propionylamino)ethyl]-piperidine hydrochloride using in place of 4-phenyl-1-[2-(N-phenyl-N-propionylamino)ethyl] - 1,2,3,6-tetrahydropyridine hydrochloride the respective 4-phenyl-1-(N-phenyl-N-acylaminoalkyl)-1,2,3,6-tetrahydropyridine hydrochlorides of Examples 2, 3 and 4, there are obtained 4 - phenyl - 1-[3-(N-phenyl-N-propionylamino)propyl]-piperidine hydrochloride, 4-phenyl - 1 - [2-(N-phenyl-N-acetylamino)ethyl]piperidine hydrochloride and 4-phenyl-[2-(N-phenyl-N-[n-butanoyl])ethyl]piperidine hydrochloride, respectively.

Similarly, following the above procedure for the preparation of 4-phenyl-1-[2-(N-phenyl-N-propionylamino)-ethyl]piperidine hydrochloride using in place of 4-phenyl-1 - [2-(N-phenyl-N-propionylamino)ethyl]-1,2,3,6-tetrahydropyridine hydrochloride the 1-[N-(lower-aromatic)-N - (lower-carboxylic-acylamino) - (polycarbon-lower-alkyl)] - 4 - (lower-aryl)-1,2,3,6-tetrahydropyridines of Examples 5–43, there are obtained the corresponding respective 1 - [N-(lower-aromatic)-N-(lower-carboxylic-acylamino)-(polycarbon-lower-alkyl)] - 4 - (lower-aryl)-piperidines, e.g., 1 - [2-(N-2-methoxyphenylpropionamido)ethyl]-4-phenylpiperidine hydrochloride is obtained using 1 - [2-(N-[2-methoxyphenyl]-N-propionylamino)-ethyl]-4-phenyl-1,2,3,6-tetrahydropyridine hydrochloride of Example 5.

Following the procedure described in Example 44 using 4 - phenyl-1-[2-(N-phenyl-N-propionylamino)ethyl]-piperidine hydrochloride in place of the corresponding di-substituted-1,2,3,6-tetrahydropyridine, there is obtained 4 - phenyl - 1 - [2-(N-phenyl-N-propionylamino)ethyl]pi-peridine methochloride. Using allyl chloride or benzyl bromide as the quaternizing agent, there is obtained 4-phenyl - 1 - [2-(N-phenyl-N-propionylamino)ethyl]piper-idine allochloride or 4-phenyl-1-[2-(N-phenyl-N-propionylamino)ethyl]piperidine benzobromide, respectively.

The 1 - [N - (lower-aromatic)-N-(lower-carboxylic-acylamino) (polycarbon-lower-alkyl)] - 4 - (lower-aryl)-1,2,3,6-tetrahydropyridines and 1-[N-(lower-aromatic)-N - (lower-carboxylic-acylamino) - (polycarbon-lower-alkyl)]-4-(lower-aryl)piperidines of my invention can be formulated in the manner usual for antitussive agents and analgesics. For example, they can be formulated in liquid preparations, e.g., aqueous or aqueous-ethanol menstruum, or in solid form, e.g., tablet or powder. The tablet formulation can be prepared using conventional excipients; and the powder can be formulated in capsule form. These preparations can be administered orally or, in the case of the aqueous preparations of the compounds having analgesic activity, intramuscularly or subcutaneously. For use as antitussive agents the compounds can be prepared for oral administration as syrups or elixirs by combinnig the compounds with usual liquid diluents or carriers including, if desired, sweetening and flavoring agents.

I claim:
1. An acid-addition salt of 4-phenyl-1-[(N-phenyl-N-lower - alkanoylamino) - (lower - alkylene)]-1,2,3,6-tetra-hydropyridine.
2. 4 - phenyl - 1 - [(N-phenyl-N-lower alkanoylamino)-(lower-alkylene)]-1,2,3,6-tetrahydropyridine.
3. An acid-addition salt of 4-phenyl-1-[2-(N-phenyl-N-propionylamino)ethyl]-1,2,3,6-tetrahydropyridine.
4. An acid-addition salt of 4-phenyl-1-[3-(N-phenyl-N-propionylamino)propyl]-1,2,3,6-tetrahydropyridine.
5. An acid-addition salt of 4-phenyl-1-[2-(N-phenyl-N-acetylamino)ethyl]-1,2,3,6-tetrahydropyridine.
6. An acid-addition salt of 4-phenyl-1-[2-(N-phenyl-N-[n-butanoyl]amino)ethyl]-1,2,3,6-tetrahydropyridine.
7. A lower-alkohalide of 4-phenyl-1-[2-(N-phenyl-N-propionylamino)ethyl]-1,2,3,6-tetrahydropyridine.
8. A compound having the structural formula

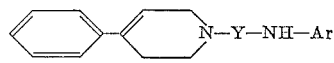

where Y represents polycarbon-lower-alkylene and Ar represents monocarbocyclic-aryl having six ring-carbon atoms.

9. An acid-addition salt of the compound of claim 8.
10. An acid-addition salt of 4-phenyl-1-[phenylamino-(polycarbon-lower-alkyl)]-1,2,3,6-tetrahydropyridine.
11. An acid-addition salt of 4 - phenyl - 1-(2-phenyl-aminoethyl)-1,2,3,6-tetrahydropyridine.
12. An acid-addition salt of the 1-[(N-aryl-N-acylam-ino)-alkyl]-4-phenylpiperidine having in free base form the structural formula

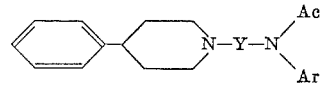

where Y represents polycarbon-lower-alkylene, Ac represents lower-alkanoyl and Ar represents monocarbocyclic-aryl having six ring-carbon atoms.

13. An acid-addition salt of 4-phenyl-1-[(N-phenyl-N-lower-alkanoylamino) - (polycarbon-lower-alkyl)]piperi-dine.
14. An acid-addition salt of 4-phenyl-1-[2-(N-phenyl-N-propionylamino)ethyl]piperidine.
15. A compound of the formula

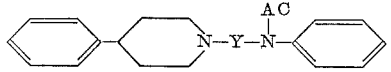

wherein Y is polycarbon-lower-alkylene and AC represents lower-alkanoyl.

16. A composition of matter selected from the group consisting of 1 - [N - Ar - N-Ac-amino-polycarbon-lower-alkyl]-4-Ar'-piperidines and acid-addition and lower-alkyl, alkenyl, and aralkyl quaternary ammonium salts thereof, wherein Ar is an aromatic radical of from one to two rings selected from the class consisting of Ar', biphenylyl, pyridyl, pyrimidyl, furyl, thiazolyl, oxazolyl, thiazinyl and thienyl; Ar' is aryl selected from the class consisting of naphthyl, phenyl, and phenyl substituted with from one to three substituents selected from the groups consisting of lower alkyl, lower-alkoxy, lower-alkylmercapto, lower-alkylsulfonyl, halo, lower-alkylamino, di-(lower-alkyl)-amino, nitro, amino, AcNH-, trifluoromethyl, phenoxy, benzyloxy, hydroxy, phenyl-mercapto benzyl and 4-methoxyphenoxy; and Ac is a carboxylic acyl group of from two to seven carbon atoms, inclusive, selected from the class consisting of alkanoyl, alkenoyl, alkoxyalkanoyl and carboxyalkanoyl.

17. A composition of matter selected from the group consisting of compounds of the formula

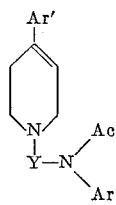

and acid-addition and lower-alkyl, alkenyl, and aralkyl quaternary-ammonium salts thereof, wherein Ar is an aromatic radical of from one to two aromatic rings selected from the class consisting of Ar', biphenylyl, pyridyl, pyrimidyl, furyl, thiazolyl, oxazolyl, thiazinyl and thienyl; Ar' is a member of the class consisting of naphthyl, phenyl, and phenyl substituted with from one to three substituents selected from the groups consisting of lower-alkyl, lower-alkoxy, lower-alkylmercapto, lower-alkylsulfonyl, halo, lower-alkylamino, di-(lower-alkyl)-amino, nitro, amino, AcNH-, trifluoromethyl, phenoxy, benzyloxy, hydroxy, phenylmercapto, benzyl and 4-methoxyphenoxy; Ac is a carboxylic acyl group of from two to seven carbon atoms, inclusive, selected from the class consisting of alkanoyl, alkenoyl, alkoxyalkanoyl and carboxyalkanoyl; and Y is alkylene of from two to six carbon atoms.

References Cited by the Examiner

UNITED STATES PATENTS

| | | | |
|---|---|---|---|
| 2,765,338 | 10/1956 | Suter et al. | 260—562 |
| 2,801,247 | 7/1957 | Smith et al. | 260—294 |
| 2,929,818 | 3/1960 | Janssen | 260—295 |
| 3,056,797 | 10/1962 | Shapiro et al. | 260—294.7 |
| 3,117,139 | 1/1964 | Mooradian | 260—294.3 |

NICHOLAS S. RIZZO, *Primary Examiner.*

IRVING MARCUS, WALTER A. MODANCE,
*Examiners.*